(12) United States Patent
Tatsumoto et al.

(10) Patent No.: US 11,720,097 B2
(45) Date of Patent: *Aug. 8, 2023

(54) VEHICLE CONTROL SYSTEM AND VEHICLE CONTROL METHOD

(71) Applicant: TOYOTA JIDOSHA KABUSHIKI KAISHA, Toyota (JP)

(72) Inventors: Yuki Tatsumoto, Nagoya (JP); Tsukasa Nakanishi, Nagoya (JP); Yuta Morikawa, Miyoshi (JP); Yuki Ito, Iwakura (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,829

(22) Filed: Feb. 24, 2022

(65) Prior Publication Data

US 2022/0179412 A1 Jun. 9, 2022

Related U.S. Application Data

(63) Continuation of application No. 16/897,629, filed on Jun. 10, 2020, now Pat. No. 11,287,813.

(30) Foreign Application Priority Data

Jul. 24, 2019 (JP) ................. 2019-136248

(51) Int. Cl.
G05D 1/00 (2006.01)

(52) U.S. Cl.
CPC ......... *G05D 1/0038* (2013.01); *G05D 1/0044* (2013.01); *G05D 1/0061* (2013.01)

(58) Field of Classification Search
CPC .. G05D 1/0038; G05D 1/0044; G05D 1/0061; G05D 2201/0213; G05D 1/0027; G05D 1/0088; G05D 2201/0212; B60W 60/0015; B60W 60/005; B60W 60/0059; B60W 30/18
USPC .............................................................. 701/2
See application file for complete search history.

(56) References Cited

U.S. PATENT DOCUMENTS

| | | | |
|---|---|---|---|
| 9,964,948 B2* | 5/2018 | Ullrich .................. | B60W 30/18 |
| 10,268,191 B1* | 4/2019 | Lockwood ........... | G05D 1/0027 |
| 10,564,638 B1* | 2/2020 | Lockwood ........... | G05D 1/0044 |
| 10,692,365 B2* | 6/2020 | Ran ........................ | G08G 1/167 |

(Continued)

OTHER PUBLICATIONS

Nov. 24, 2021 Notice of Allowance issued in U.S. Appl. No. 16/897,629.

*Primary Examiner* — Muhammad Shafi
(74) *Attorney, Agent, or Firm* — Oliff PLC

(57) ABSTRACT

A vehicle control system, comprising a remote operator selection server, a vehicle control device, and a remote operation terminal. The vehicle control device is configured to transmit a manual operation information to the remote operator selection server. The remote operator selection server is configured to acquire the manual operation information transmitted from the vehicle control device, to compute a difference between the manual operation information and a remote operation information for each of the plurality of remote operators, to select a remote operator for whom the difference satisfies a predetermined criterion as a remote operator to remotely operate the vehicle.

5 Claims, 13 Drawing Sheets

(56) References Cited

U.S. PATENT DOCUMENTS

| | | | |
|---|---|---|---|
| 2014/0207535 A1 | 7/2014 | Stefan et al. | |
| 2017/0308082 A1* | 10/2017 | Ullrich | G05D 1/0061 |
| 2018/0365908 A1* | 12/2018 | Liu | G05D 1/0044 |
| 2019/0196464 A1* | 6/2019 | Lockwood | G05D 1/0016 |

* cited by examiner

FIG.3

| VEHICLE ID | MANUAL OPERATION INFORMATION |
|---|---|
| XXX | H |

| DATE OF MANUAL OPERATION | SPEED | ACCELERATION | ... |
|---|---|---|---|
| 10 JAN 2019 | ... | ... | ... |
| 12 JAN 2019 | ... | ... | ... |
| 5 FEB 2019 | ... | ... | ... |
| 11 FEB 2019 | ... | ... | ... |
| ... | ... | ... | ... |

FIG.5

| REMOTE OPERATION TERMINAL ID | REMOTE OPERATION INFORMATION |
|---|---|
| YYY | R1 |
| ZZZ | R2 |
| ... | ... |
| ... | ... |

| DATE OF REMOTE OPERATION | SPEED | ACCELERATION | ... |
|---|---|---|---|
| 9 JAN 2019 | ... | ... | ... |
| 15 JAN 2019 | ... | ... | ... |
| 9 FEB 2019 | ... | ... | ... |
| 19 FEB 2019 | ... | ... | ... |
| ... | ... | ... | ... |

FIG.10

| REMOTE OPERATION TERMINAL ID | REMOTE OPERATION INFORMATION | EVALUATION INFORMATION |
|---|---|---|
| YYY | R1 | E1 |
| ZZZ | R2 | E2 |
| ... | ... | ... |
| ... | ... | ... |

| DATE OF REMOTE OPERATION | EVALUATION INFORMATION | |
|---|---|---|
| 9 JAN 2019 | 5 | FEW SUDDEN CHANGES IN SPEED, STEADY DRIVING |
| 15 JAN 2019 | 1 | ROUGH DRIVING AROUND CURVES |
| 9 FEB 2019 | ... | ... |
| 19 FEB 2019 | ... | ... |
| ... | ... | ... |

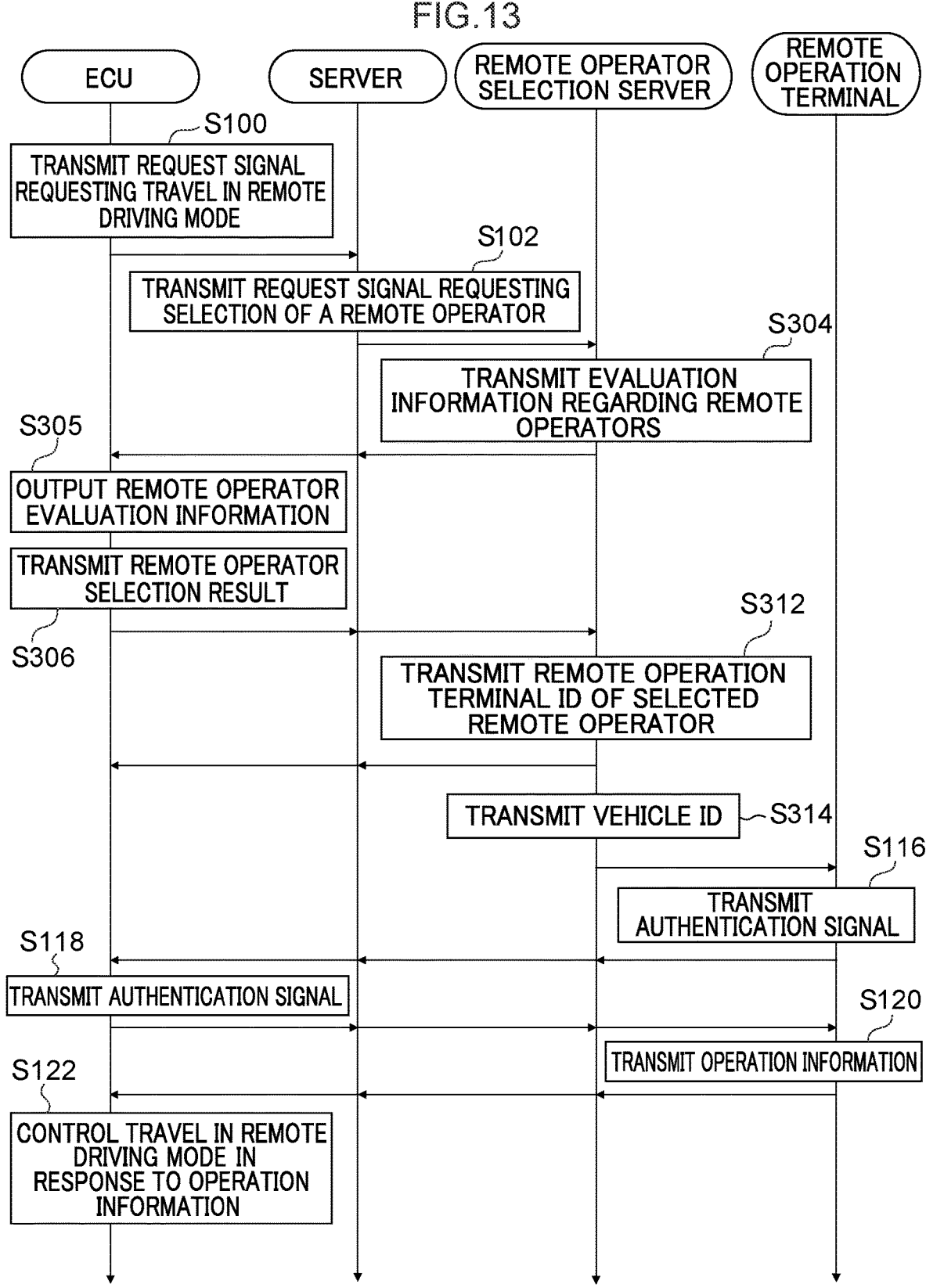

VEHICLE CONTROL SYSTEM AND VEHICLE CONTROL METHOD

CROSS-REFERENCE TO RELATED APPLICATION

This application is a continuation of U.S. application Ser. No. 16/897,629 filed Jun. 10, 2020, which is now U.S. Pat. No. 11,287,813, and is based on and claims priority under 35 USC 119 from Japanese Patent Application No. 2019-136248 filed on Jul. 24, 2019, the disclosures of which are incorporated by reference herein.

BACKGROUND

Technical Field

The technology disclosed herein relates to a vehicle control system and a vehicle control method.

Related Art

The specification of U.S. Pat. No. 9,964,948 discloses a system for controlling a vehicle remotely.

Were vehicles that travel under remote operation such as that disclosed in the specification of U.S. Pat. No. 9,964,948 (such vehicles are referred to hereafter as "vehicles that travel in a remote driving mode") to become widespread, it is envisaged that the number of remote operators operating remote operation terminals would increase.

In such a situation, individual differences in vehicle operation would emerge between remote operators. It is therefore envisaged that, for example, there would be demand from vehicle occupants for driving tailored to their preferences to be performed when traveling in the remote driving mode.

However, the specification of U.S. Pat. No. 9,964,948 only discloses remote control of a self-traveling vehicle, and does not consider remote operation tailored to the preferences of the occupant. Accordingly, if employing the technology disclosed in U.S. Pat. No. 9,964,948, it would not be possible to implement remote operation tailored to the preferences of the vehicle occupant when the vehicle travels in the remote driving mode.

SUMMARY

A vehicle control system according to a first aspect includes a remote operator selection server comprising: a first memory, and a first processor coupled to the first memory; a vehicle control device comprising: a second memory, and a second processor coupled to the second memory, the second processor being configured to control a vehicle configured to travel in an independent autonomous driving mode, a remote driving mode, and a manual driving mode; and a remote operation terminal comprising: a third memory, and a third processor coupled to the third memory, the third processor being configured to operate a vehicle remotely, wherein: the second processor is configured to refer to the second memory, which stores manual operation information representing details of actual operation by an occupant of the vehicle when in the manual driving mode, and to transmit the manual operation information for the occupant stored in the second memory from the vehicle control device to the remote operator selection server; the first processor is configured to acquire the manual operation information transmitted from the vehicle control device, to refer to the first memory, which stores remote operation information for each of a plurality of remote operators, the remote operation information representing details of actual remote vehicle operation by a remote operator, to compute a difference between the manual operation information and the remote operation information for each of the plurality of remote operators, to select a remote operator for whom the difference satisfies a predetermined criterion as a remote operator to remotely operate the vehicle, to transmit remote operator information representing the selected remote operator from the remote operator selection server to the vehicle control device, and to transmit vehicle information representing the vehicle from the remote operator selection server to the remote operation terminal, which is operated by the selected remote operator; and the second processor is further configured to control travel of the vehicle in response to operation information transmitted from the remote operation terminal corresponding to the remote operator information transmitted from the remote operator selection server at a time of causing the vehicle to travel in the remote driving mode.

A vehicle control system according to a second aspect includes a remote operator selection server comprising: a first memory, and a first processor coupled to the first memory; a vehicle control device comprising: a second memory, and a second processor coupled to the second memory, the second processor being configured to control a vehicle configured to travel in an independent autonomous driving mode, a remote driving mode, and a manual driving mode; and a remote operation terminal comprising: a third memory, and a third processor coupled to the third memory, the third processor being configured to operate a vehicle remotely, wherein: the second processor is configured to acquire evaluation information representing an evaluation of a remote operator that is input by an occupant of the vehicle either during travel in the remote driving mode or after travel in the remote driving mode has ended, and to transmit the acquired evaluation information from the vehicle control device to the remote operator selection server; the first processor is configured to append the evaluation information transmitted from the vehicle control device to remote operator information representing the evaluated remote operator, and to store the evaluation information in the first memory, which stores the evaluation information for each of a plurality of remote operators; the first processor is further configured to transmit the evaluation information regarding the plurality of remote operators stored in the first memory to the vehicle control device at a time of switching the vehicle to the remote driving mode; the second processor is further configured to output the evaluation information regarding the plurality of remote operators transmitted from the remote operator selection server through an output device inside the vehicle, to acquire a remote operator selection result that is input by the occupant of the vehicle, and to transmit the remote operator selection result from the vehicle control device to the remote operator selection server; the first processor is further configured to select a remote operator to remotely operate the vehicle in response to the selection result transmitted from the vehicle control device, to transmit remote operator information representing the selected remote operator from the remote operator selection server to the vehicle control device, and to transmit vehicle information representing the vehicle from the remote operator selection server to the remote operation terminal, which is operated by the selected remote operator; and the second processor is further configured to control travel of the vehicle in response to operation information transmitted from the remote operation terminal corresponding to the remote operator information transmitted from the remote operator selection server at a time of causing the vehicle to travel in the remote driving mode.

BRIEF DESCRIPTION OF DRAWINGS

FIG. 3 is an explanatory diagram to explain an example of manual operation information;

FIG. 4 is an explanatory diagram to explain an example of manual operation information;

FIG. 5 is an explanatory diagram to explain an example of remote operation information;

FIG. 6 is an explanatory diagram to explain an example of remote operation information;

FIG. 10 is an explanatory diagram to explain an example of evaluation information;

FIG. 11 is an explanatory diagram to explain an example of evaluation information;

FIG. 13 is a diagram illustrating an example of a sequence executed by a vehicle control system according to the second exemplary embodiment.

DETAILED DESCRIPTION

First Exemplary Embodiment

Explanation follows regarding a first exemplary embodiment of a vehicle control system, with reference to the drawings.

Figure 1:
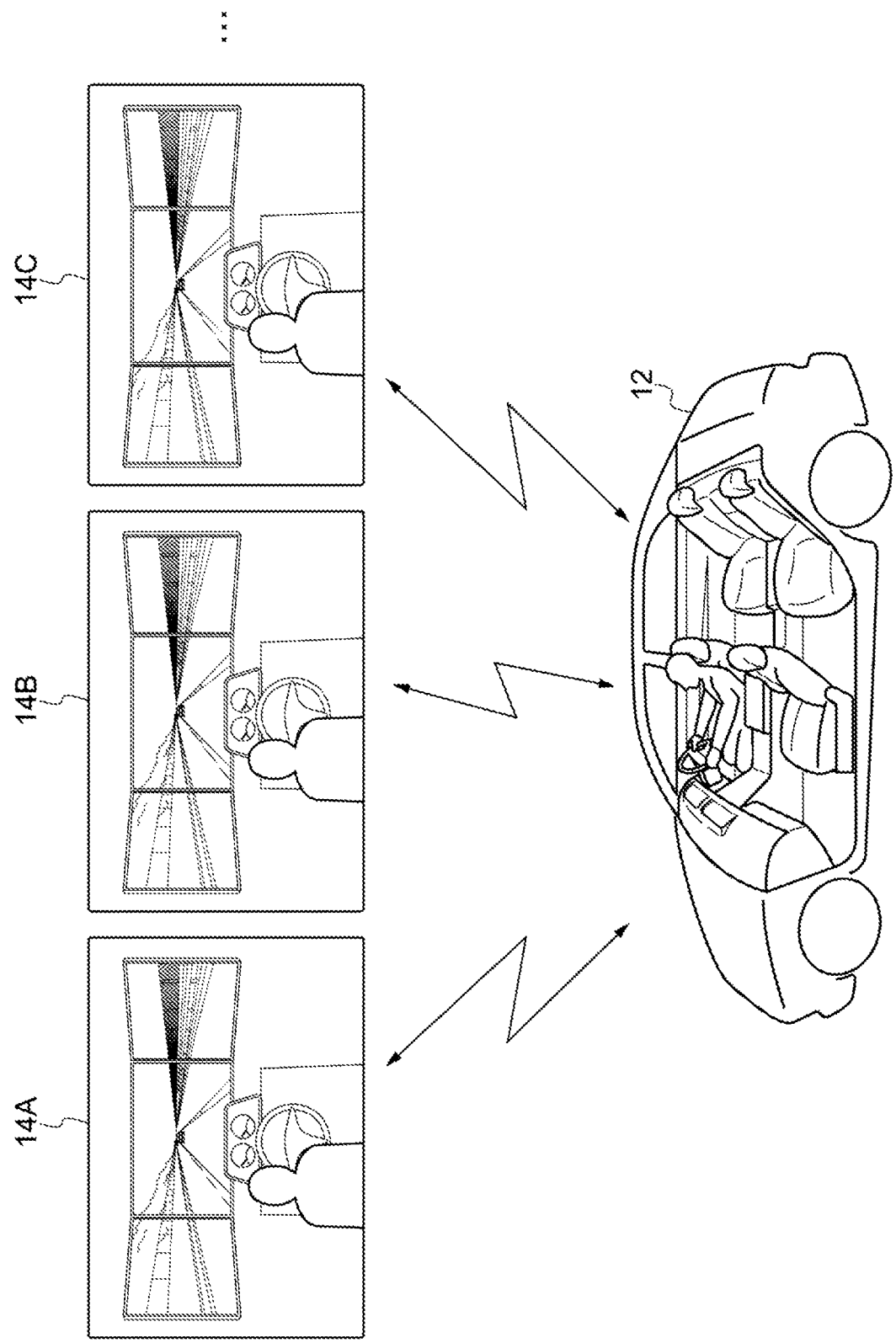
FIG. 1 is an explanatory diagram outlining an exemplary embodiment.

FIG. 1 is an explanatory diagram outlining the present exemplary embodiment. FIG. 1 envisages a situation in which a vehicle 12 plans to travel in a remote driving mode. The case envisaged in FIG. 1 includes plural remote operation terminals 14A, 14B, 14C, and plural remote operators to operate the plural remote operation terminals 14A, 14B, 14C. Remote operation of the vehicle 12 may be performed by any remote operator out of these plural remote operators.

In this situation, it is envisaged that an occupant on board the vehicle may wish to select a remote operator who will drive in a manner suited to the preferences of the occupant. The occupant may feel uneasy if the vehicle is remotely operated by a remote operator who drives in a manner that is different from the normal driving of the occupant.

Thus, in the vehicle control system of the first exemplary embodiment, operation information relating to normal driving operation by the vehicle occupant is held in a predetermined storage section. When the vehicle is to travel in the remote driving mode, the vehicle control system then selects a remote operator who will perform driving operation that is similar to the normal driving operation of the occupant. Driving operation that is similar to the driving operation of the occupant is thereby performed by the remote operator, thereby implementing remote operation tailored to the preferences of the vehicle occupant.

Specific explanation follows regarding this.

Figure 2:
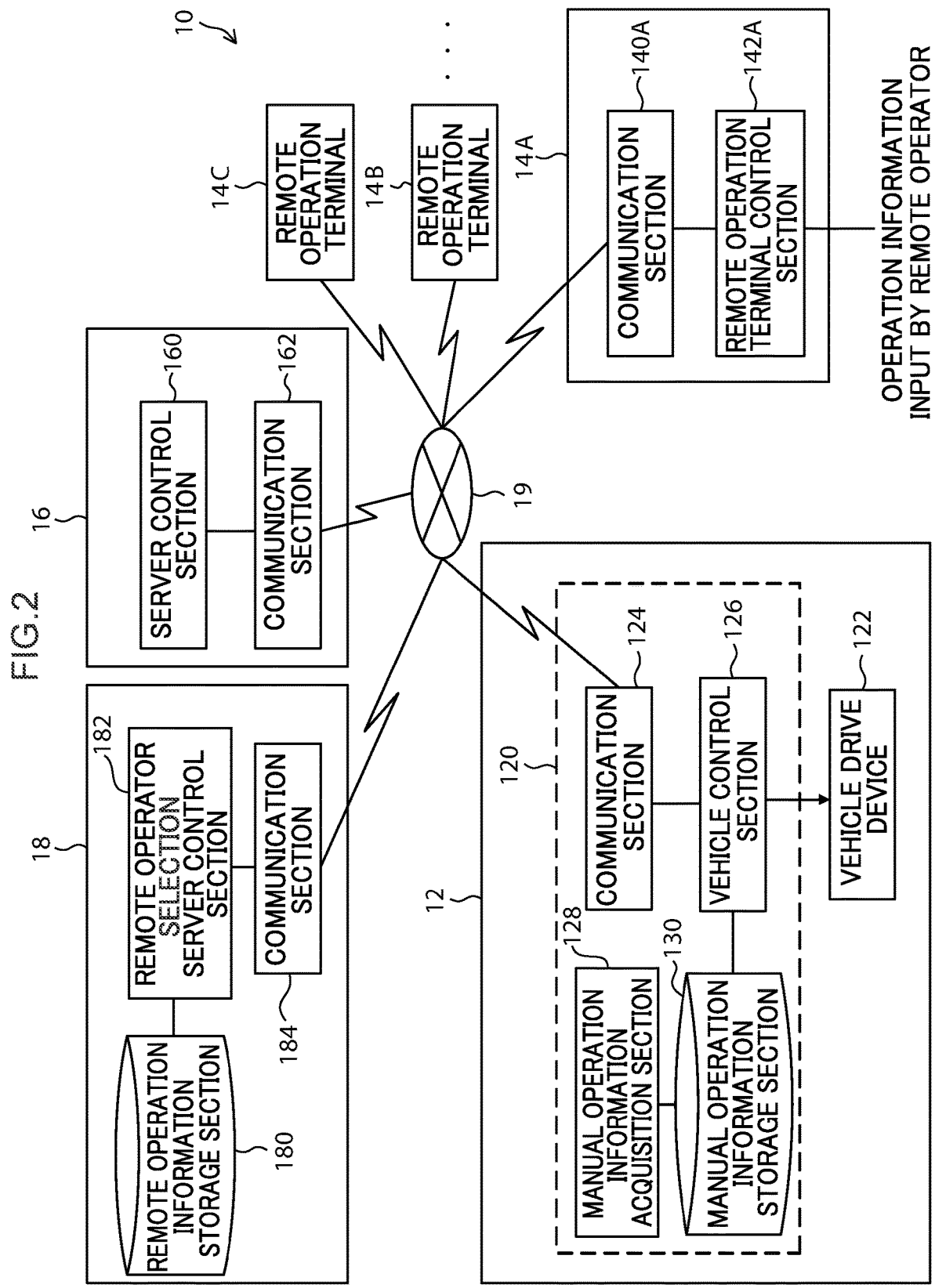
FIG. 2 is a schematic block diagram illustrating a vehicle control system according to a first exemplary embodiment.

FIG. 2 is a block diagram illustrating an example of configuration of a vehicle control system 10 according to the first exemplary embodiment. As illustrated in FIG. 2, the vehicle control system 10 includes the vehicle 12, the plural remote operation terminals 14A, 14B, 14C, . . . , a server 16, and a remote operator selection server 18. The vehicle 12, the plural remote operation terminals 14A, 14B, 14C, . . . , the server 16, and the remote operator selection server 18 are connected together through a predetermined communication network 19. Note that although only the remote operation terminals 14A, 14B, 14C, . . . , are illustrated as the plural remote operation terminals in FIG. 2, in reality more remote operation terminals would be present. Likewise, although only the vehicle 12 is illustrated as a vehicle in FIG. 2, in reality more vehicles would be present.

Vehicle

The vehicle of the present exemplary embodiment is a vehicle capable of traveling in an independent autonomous driving mode, the remote driving mode, and a manual driving mode. The independent autonomous driving mode is a driving mode in which the vehicle travels independently based on information successively detected by various sensors provided to the vehicle. The remote driving mode is a driving mode in which the vehicle travels based on operation information output from a remote operation terminal. The manual driving mode is a driving mode in which the vehicle travels by being driven by an occupant on board the vehicle. Note that the driving modes represent types of travel control of the vehicle.

The vehicle 12 includes an electronic control unit (ECU) 120 that controls vehicle travel, and a vehicle drive device 122 that drives the vehicle in response to control signals from the ECU 120. The ECU 120 is an example of a vehicle control device of the present disclosure.

As illustrated in FIG. 2, functionality of the ECU 120 includes a communication section 124, a vehicle control section 126, a manual operation information acquisition section 128, and a manual operation information storage section 130.

The communication section 124 exchanges information with other devices.

The vehicle control section 126 acquires operation information transmitted from any remote operation terminal out of the plural remote operation terminals through the server 16. The operation information transmitted from the remote operation terminal is operation information input to the remote operation terminal by the corresponding remote operator.

The vehicle control section 126 also acquires operation information input by the occupant on board the vehicle.

The vehicle control section 126 also acquires information relating to independent travel. For example, information relating to independent travel includes control signals from other ECUs, or sensor signals from various sensors (image sensors, laser radar sensors, or the like) installed in the vehicle.

The vehicle control section 126 controls driving of the vehicle drive device 122 based on various externally input information. For example, the vehicle control section 126 switches between the independent autonomous driving mode, the remote driving mode, and the manual driving mode based on various acquired information.

The manual operation information acquisition section 128 successively acquires manual operation information representing details of actual operation by the occupant of the vehicle 12 when the vehicle 12 is traveling in the manual driving mode. The manual operation information acquisition section 128 then stores the manual operation information for the vehicle 12 in the manual operation information storage section 130. Note that it is assumed herein that the vehicle 12 is always driven by the same occupant.

The manual operation information for the occupant of the vehicle 12 is held in the manual operation information storage section 130. FIG. 3 illustrates an example of information held by the manual operation information storage section 130. In this example, the manual operation information for the occupant is held in a table format as illustrated in FIG. 3. In the table illustrated in FIG. 3, a vehicle ID representing identification information of the vehicle 12 (or an occupant ID representing identification information of the occupant) and the manual operation information for the occupant are held associated with each other. The vehicle ID or the occupant ID is an example of vehicle information representing the vehicle.

FIG. 4 illustrates an example of manual operation information H for an occupant of a vehicle with a vehicle ID of "XXX". As illustrated in FIG. 4, information regarding vehicle speed, acceleration, and so on during manual operation by the occupant is held as the manual operation information.

Remote Operation Terminal

Since configuration of the remote operation terminal 14A and configuration of the remote operation terminals 14B, 14C are similar to each other, explanation follows regarding configuration of the remote operation terminal 14A only.

As illustrated in FIG. 2, functionality of the remote operation terminal 14A includes a communication section 140A and a remote operation terminal control section 142A.

The communication section 140A exchanges information with other devices.

The remote operation terminal control section 142A controls the remote operation terminal 14A. For example, the remote operation terminal control section 142A controls the communication section 140A so as to acquire operation information input by the remote operator and transmit this operation information to the server 16.

Server

As illustrated in FIG. 2, functionality of the server 16 includes a server control section 160 and a communication section 162.

The server control section 160 controls the server 16. For example, the server control section 160 controls the communication section 162 so as to acquire operation information transmitted from any remote operation terminal out of the plural remote operation terminals and transmit this operation information to the vehicle 12.

The communication section 162 exchanges information with other devices.

Remote Operator Selection Server

As illustrated in FIG. 2, functionality of the remote operator selection server 18 includes a remote operation information storage section 180, a remote operation server control section 182, and a communication section 184.

The remote operation information storage section 180 holds remote operation information for each of the plural remote operators, representing details of actual remote operation of vehicles by each remote operator. The remote operation information is vehicle operation information corresponding to past vehicle operation by the remote operator. FIG. 5 illustrates an example of information held in the remote operation information storage section 180. For example, the remote operation information for each of the plural remote operators is held in a table format as illustrated in FIG. 5. In the table illustrated in FIG. 5, remote operation terminal IDs representing identification information for the remote operation terminals (or remote operator IDs representing identification information for the remote operators) and remote operation information corresponding to each remote operator are held associated with each other. Note that it is assumed herein that one remote operation terminal is allocated to each of the plural remote operators.

FIG. 6 illustrates an example of remote operation information R1 for a remote operator with a remote operation terminal ID of "YYY". As illustrated in FIG. 6, information regarding vehicle speed, acceleration, and so on during past remote operation by the remote operator is held as the remote operation information.

The remote operation server control section 182 controls the remote operator selection server 18. For example, the remote operation server control section 182 selects a remote operation terminal from out of the plural remote operation terminals and controls the communication section 184 so as to transmit the remote operation terminal ID of the selected remote operation terminal to the vehicle 12.

The communication section 184 exchanges information with other devices.

Figure 7:
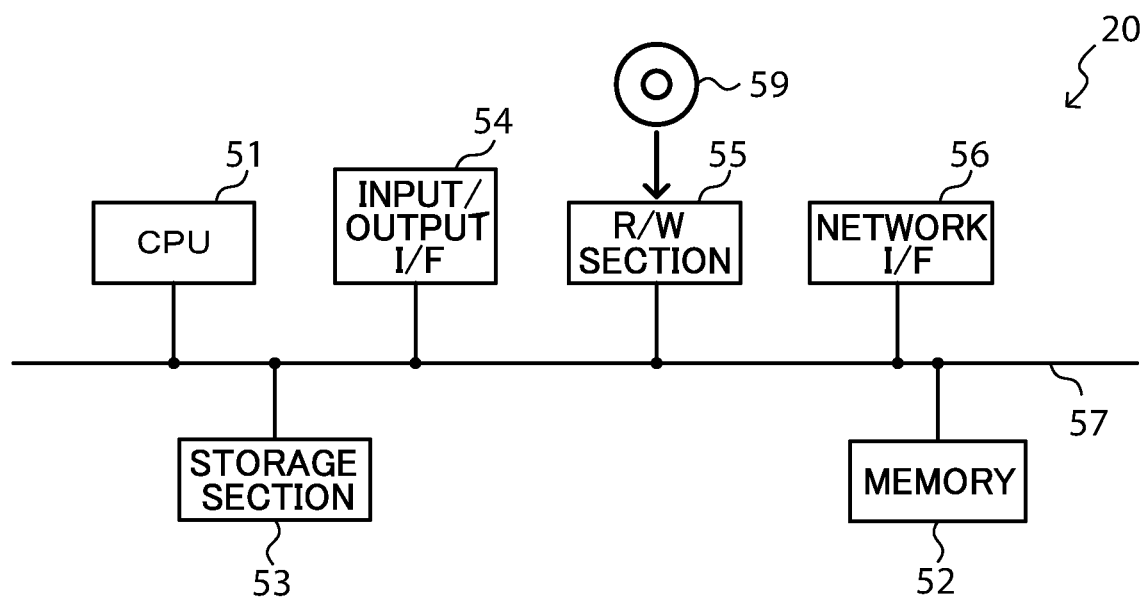
FIG. 7 is a diagram illustrating an example of configuration of a computer corresponding to respective devices configuring a vehicle control system.

The ECU 120 of the vehicle 12, the plural remote operation terminals 14A, 14B, 14C, the server 16, and the remote operator selection server 18 may respectively be realized by a computer 20, an example of which is illustrated in FIG. 7. The computer 20 includes a CPU 51, memory 52 serving as a temporary storage region, and a non-volatile storage section 53. The computer 20 further includes an input/output interface (I/F) 54 to which an input/output device or the like (not illustrated in the drawings) is connected, and a read/write (R/W) section 55 that controls reading and writing of data with respect to a recording medium 59. The computer 20 also includes a network I/F 56 that is connected to a network such as the internet. The CPU 51, the memory 52, the storage section 53, the input/output I/F 54, the R/W section 55, and the network I/F 56 are connected together through a bus 57.

The storage section 53 may be realized by a hard disk drive (HDD), a solid state drive (SSD), flash memory, or the like. A program to cause the computer 20 to function is stored in the storage section 53, serving as a storage medium. The CPU 51 reads the program from the storage section 53, expands the program in the memory 52, and executes processes of the program in sequence.

Explanation follows regarding operation of the vehicle control system 10 of the first exemplary embodiment. Note that in the following explanation, selection of a remote operator is performed while the vehicle 12 is traveling in the independent autonomous driving mode or the manual driving mode.

Figure 8:
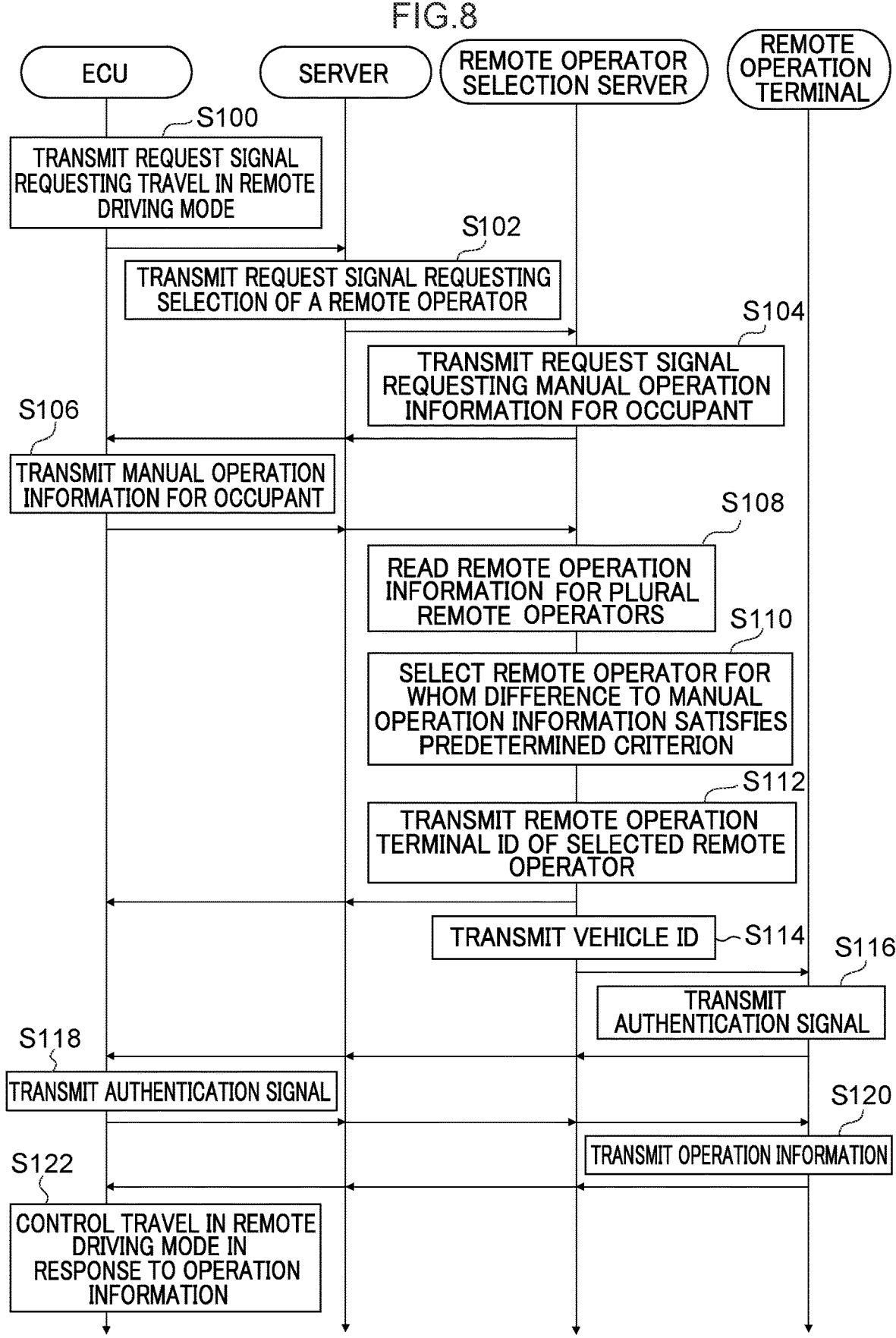
FIG. 8 is a diagram illustrating an example of a sequence executed by a vehicle control system according to the first exemplary embodiment.

While traveling in the manual driving mode or the independent autonomous driving mode, the vehicle 12 executes the vehicle control processing sequence illustrated in FIG. 8 in order to switch to travel in the remote driving mode.

At step S100, the ECU 120 of the vehicle 12 acts as the vehicle control section 126 to transmit the vehicle ID of the vehicle 12 and a request signal requesting travel in the remote driving mode to the server 16.

At step S102, on receiving the vehicle ID and the request signal transmitted from the ECU 120 of the vehicle 12, the server 16 transmits a request signal requesting selection of a remote operator to the remote operator selection server 18.

At step S104, on receiving the request signal transmitted from the server 16, the remote operator selection server 18 transmits a request signal requesting manual operation information for the occupant of the vehicle 12 to the ECU 120.

At step S106, on receiving the request signal transmitted from the remote operator selection server 18, the ECU 120 reads the manual operation information for the occupant from the manual operation information storage section 130. The ECU 120 then transmits the read manual operation information to the remote operator selection server 18.

Note that when this is performed, the type of manual operation information transmitted to the remote operator selection server 18 may be selected by the occupant of the vehicle 12. For example, various types of manual operation information, such as information relating to speed and acceleration, are held in the manual operation information storage section 130 as illustrated in FIG. 4. The occupant of the vehicle 12 may therefore choose which type of manual operation information to focus on, and input their chosen manual operation information type to the ECU 120. In such cases, the ECU 120 transmits manual operation information of the type input by the occupant of the vehicle 12 to the remote operator selection server 18.

At step S108, on receiving the manual operation information for the occupant of the vehicle 12, the remote operator selection server 18 refers to the remote operation information storage section 180, and reads the remote operation information for the plural remote operators held in the remote operation information storage section 180.

At step S110, the remote operator selection server 18 computes differences between the manual operation information received at step S108 and the remote operation information for each of the plural remote operators read at step S108. The remote operator selection server 18 then selects a remote operator for whom the difference satisfies a predetermined criterion as the remote operator to remotely operate the vehicle 12.

For example, the difference between a given value in the remote operation information and a corresponding value in the manual operation information may be employed as the difference between the remote operation information and the manual operation information. For example, the differences between speed values in the remote operation information and a speed value in the manual operation information may be computed, and the remote operator corresponding to the smallest difference may be selected as having satisfied the predetermined criterion.

Alternatively, for example, a remote operator for whom the difference between a speed value in the remote operation information and a speed value in the manual operation information is a threshold value or below may be selected as having satisfied the predetermined criterion. In such a case, there is a possibility of plural remote operators being selected. When this occurs, the plural remote operators may be presented to the occupant of the vehicle 12 as candidates, with a remote operator selected by the occupant of the vehicle 12 being set as the remote operator to remotely operate the vehicle 12.

Note that in this example, it is assumed that the remote operator operating the remote operation terminal 14A is selected.

At step S112, the remote operator selection server 18 transmits the remote operation terminal ID of the remote operation terminal 14A operated by the remote operator selected at step S110 to the ECU 120 of the vehicle 12. The occupant of the vehicle 12 is thereby able to tell which remote operator is the remote operation candidate. The remote operation terminal ID of the remote operation terminal 14A operated by the selected remote operator is an example of remote operator information.

At step S114, the remote operator selection server 18 transmits the vehicle ID of the vehicle 12 received at step S108 to the remote operation terminal 14A operated by the selected remote operator.

At step S116, the remote operation terminal 14A transmits an authentication signal to the ECU 120 in order to perform authentication between itself and the ECU 120 of the vehicle 12.

At step S118, on receiving the authentication signal transmitted from the remote operation terminal 14A, the ECU 120 transmits an authentication signal to the remote operation terminal 14A.

Authentication between the ECU 120 and the remote operation terminal 14A is completed by performing the processing of step S116 and step S118, thereby establishing a match between the occupant of the vehicle 12 and the remote operator at the remote operation terminal 14A. Remote operation of the vehicle 12 by the remote operation terminal 14A is started in this manner.

At step S120, the remote operator of the remote operation terminal 14A inputs operation information for the vehicle 12 into the remote operation terminal 14A. The remote operation terminal 14A then transmits this operation information to the ECU 120.

Note that the remote operator selection server 18 successively acquires the operation information transmitted from the remote operation terminal 14A and stores this operation information in the remote operation information storage section 180.

At step S122, the ECU 120 receives the operation information transmitted from the remote operation terminal 14A and controls travel of the vehicle 12 in the remote driving mode in response to the operation information.

The processing of step S120 and the processing of step S122 are repeated until travel of the vehicle 12 in the remote driving mode ends.

As described above, the vehicle control system 10 according to the first exemplary embodiment includes the server, the vehicle control device that controls the vehicle capable of traveling in the independent autonomous driving mode, the remote driving mode, and the manual driving mode, and the remote operation terminals that operate the vehicle remotely. The remote operator selection server of the vehicle control system 10 includes the remote operation information storage section that holds remote operation information for each of the plural remote operators, the remote operation information representing details of actual remote vehicle operation by the remote operator. The ECU includes the manual operation information storage section that holds the manual operation information representing details of actual operation by the occupant of the vehicle when in the manual driving mode. The ECU transmits the manual operation information for the occupant to the remote operator selection server, and the remote operator selection server acquires the manual operation information transmitted from the ECU. The remote operator selection server then refers to the remote operation information storage section, computes the difference between the remote operation information and the manual operation information for each of the plural remote operators, and selects a remote operator for whom the difference is a threshold value or below as the remote operator to remotely operate the vehicle. The remote operator selection server also transmits the remote operator information representing the selected remote operator to the ECU, and transmits vehicle information representing the vehicle to the remote operation terminal operated by the selected remote operator. When the vehicle travels in the remote driving mode, the ECU controls travel of the vehicle in response to the operation information transmitted from the remote operation terminal corresponding to the remote operator information transmitted from the remote operator selection server. This enables remote operation tailored to the preferences of the vehicle occupant to be implemented when the vehicle travels in the remote driving mode. More specifically, travel of the vehicle in the remote driving mode is performed by a remote operator having remote operation information similar to the manual operation information of the occupant.

Second Exemplary Embodiment

Explanation follows regarding a vehicle control system according to a second exemplary embodiment. Note that elements configured similarly to those of the first exemplary embodiment are allocated the same reference numerals, and explanation thereof is omitted.

A vehicle control system 210 of the second exemplary embodiment differs from the first exemplary embodiment in that an occupant of a vehicle 22 evaluates the remote operation of the remote operators, and selects a remote operator based on information relating to this evaluation.

Figure 9:
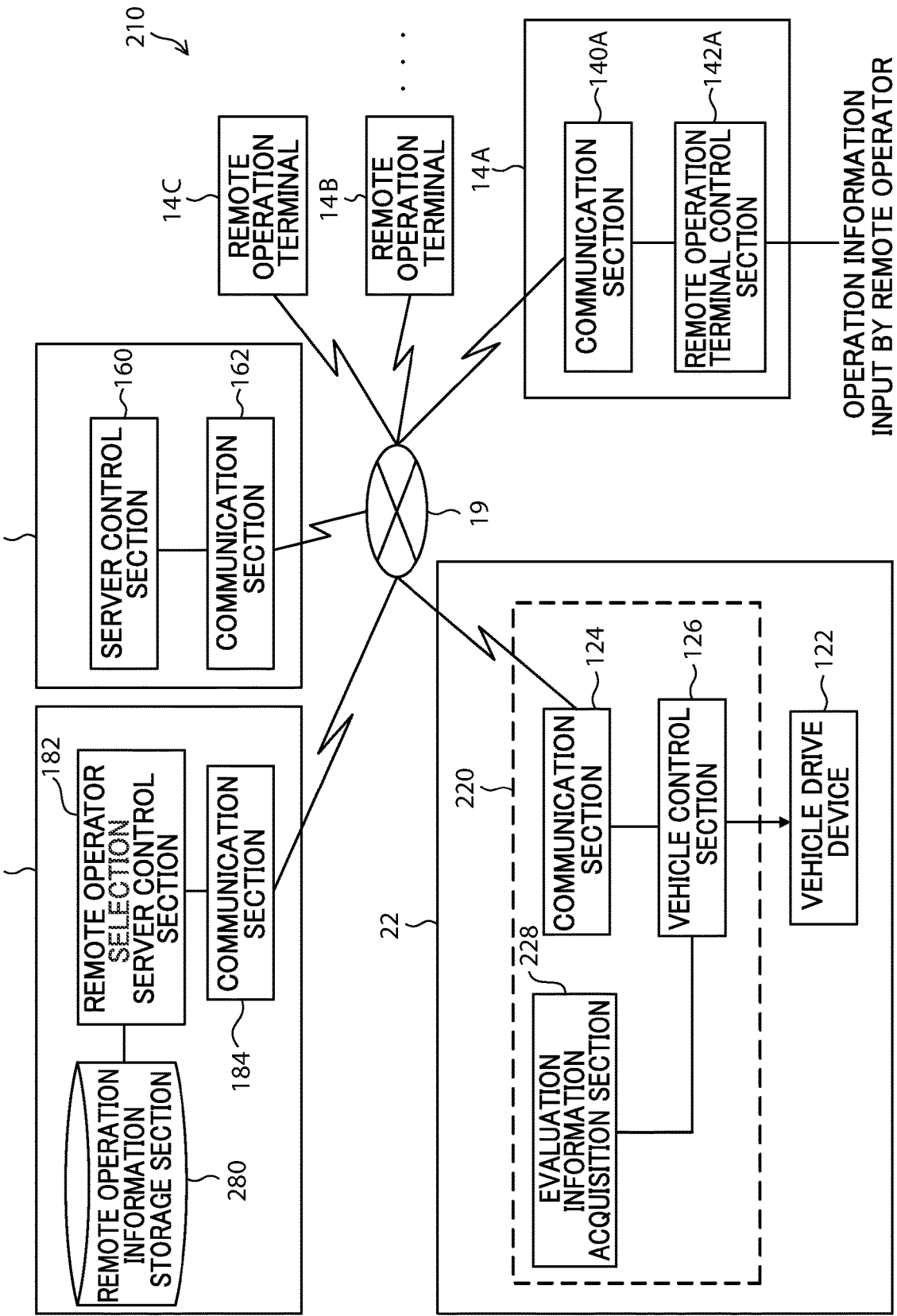
FIG. 9 is a schematic block diagram illustrating a vehicle control system according to a second exemplary embodiment.

FIG. 9 is a block diagram illustrating an example of configuration of the vehicle control system 210 according to the second exemplary embodiment. As illustrated in FIG. 9, the vehicle control system 210 includes the vehicle 22, the plural remote operation terminals 14A, 14B, 14C, . . . , the server 16, and a remote operator selection server 28.

Vehicle

The vehicle 22 includes an ECU 220 that controls vehicle travel, and the vehicle drive device 122 that drives the vehicle in response to control signals from the ECU 220. The ECU 220 is an example of a vehicle control device of the present disclosure.

As illustrated in FIG. 9, functionality of the ECU 220 includes the communication section 124, the vehicle control section 126, and an evaluation information acquisition section 228.

The evaluation information acquisition section 228 acquires evaluation information regarding the remote operator, the evaluation information being input by the occupant of the vehicle 22 either while traveling in the remote driving mode, or after travel in the remote driving mode has ended.

The evaluation information acquisition section 228 then transmits the evaluation information regarding the remote operator to the remote operator selection server 28 through the vehicle control section 126 and the communication section 124.

Remote Operator Selection Server

As illustrated in FIG. 9, functionality of the remote operator selection server 28 includes a remote operation information storage section 280, the remote operation server control section 182, and the communication section 184.

Evaluation information is held in the remote operation information storage section 280 for each of the plural remote operators. The evaluation information represents evaluation of details of remote vehicle operation by the remote operator. The evaluation information is evaluation information regarding operation during past vehicle operation by the remote operator. FIG. 10 illustrates an example of information held by the remote operation information storage section 280. In this example, the evaluation information for each of the plural remote operators is held in a table format as illustrated in FIG. 10. In the table illustrated in FIG. 10, the remote operation terminal ID representing the identification information of the remote operation terminal (or the remote operator ID representing the identification information of the remote operator) and the evaluation information regarding the remote operator are held associated with each other. The remote operation terminal ID or the remote operator ID is an example of remote operator information representing the remote operator.

FIG. 11 illustrates an example of evaluation information E1 for a remote operator with a remote operation terminal ID of "YYY". As illustrated in FIG. 11, evaluation information regarding past remote operation by each remote operator is held as the evaluation information. For example, an evaluation rating of from 1 to 5 is held as the evaluation information. As illustrated in FIG. 11, textual information expressing an evaluation of the remote operator is also held as the evaluation information. In the example illustrated in FIG. 11, information expressing "few sudden changes in speed, steady driving" is held as the evaluation information.

Figure 12:
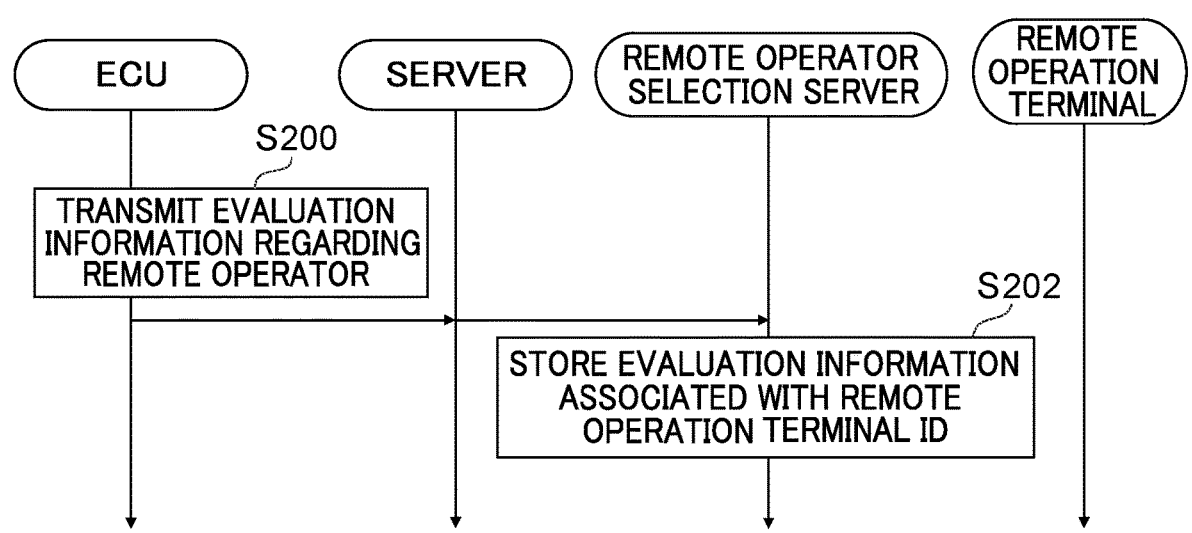
FIG. 12 is a diagram illustrating an example of a sequence executed by a vehicle control system according to the second exemplary embodiment.

Explanation follows regarding operation of the vehicle control system 210 of the second exemplary embodiment. The vehicle control processing sequence illustrated in FIG. 12 is executed either while the vehicle 22 is traveling in the remote driving mode, or after travel in the remote driving mode has ended.

At step S200, the ECU 220 of the vehicle 22 acts as the evaluation information acquisition section 228 to acquire evaluation information regarding the remote operator input by the occupant of the vehicle 22 either while traveling in the remote driving mode, or after travel in the remote driving mode has ended. At step S202, the ECU 220 acts as the evaluation information acquisition section 228 to transmit the acquired evaluation information to the remote operator selection server 28. Note that the evaluation information may include textual information regarding the remote operator.

At step S202, the remote operation server control section 182 of the remote operator selection server 28 appends the evaluation information transmitted from the ECU 220 to the remote operation terminal ID of the remote operation terminal operated by the remote operator, and stores this information in the remote operation information storage section 180.

The evaluation information held by the remote operation information storage section 180 at step S202 is employed in subsequent travel in the remote driving mode.

When evaluation information regarding remote operators has been accumulated in the remote operation information storage section 180, remote operator selection is performed according to the evaluation information held in the remote operation information storage section 180 when the vehicle 22 is to travel in the remote driving mode.

While traveling in the manual driving mode or the independent autonomous driving mode, the vehicle 22 executes the vehicle control processing sequence illustrated in FIG. 13 in order to switch to travel in the remote driving mode.

The processing of step S100 to step S102 is executed similarly to in the first exemplary embodiment.

At step S304, the remote operation server control section 182 of the remote operator selection server 28 transmits evaluation information regarding the plural remote operators held in the remote operation information storage section 180 to the ECU 220.

At step S305, the ECU 220 outputs the evaluation information regarding the plural remote operators transmitted from the remote operator selection server 28 to an output device (not illustrated in the drawings) inside the vehicle 22. For example, the ECU 220 displays the evaluation information regarding the plural remote operators on a display (not illustrated in the drawings) inside the vehicle 22. The occupant of the vehicle 22 then refers to the evaluation information, and inputs a remote operator selection result into the ECU 220. For example, the occupant of the vehicle 22 may select a remote operator based on the textual information "few sudden changes in speed, steady driving" and the evaluation rating of 5.

At step S306, the ECU 220 acquires the remote operator selection result input by the occupant of the vehicle 22, and transmits the remote operator selection result to the remote operator selection server 28.

At step S312, the remote operation server control section 182 of the remote operator selection server 28 selects the remote operator to remotely operate the vehicle 22 according to the selection result transmitted from the ECU 220, and transmits the remote operation terminal ID representing the selected remote operator to the ECU 220.

At step S314, the vehicle ID of the vehicle 22 is transmitted to the remote operation terminal 14A operated by the remote operator selected at step S312.

The processing of step S116 to step S122 is similar to that executed in the first exemplary embodiment.

Other configurations and operation of the vehicle control system 210 according to the second exemplary embodiment are similar to those in the first exemplary embodiment, and so explanation thereof is omitted.

As described above, the remote operator selection server of the vehicle control system 210 according to the second exemplary embodiment includes the remote operation information storage section that, for each of the plural remote operators, holds the evaluation information representing the evaluation of details of remote vehicle operation by the remote operator. The ECU of the vehicle acquires evaluation information regarding the remote operator input by the occupant of the vehicle either while traveling in the remote driving mode or after travel in the remote driving mode has ended, and transmits the acquired evaluation information to the remote operator selection server. The remote operator selection server then appends the evaluation information transmitted from the ECU to the corresponding remote operation terminal ID, and stores this information in the remote operation information storage section. The remote operator selection server transmits the evaluation information regarding the plural remote operators held in the remote operation information storage section to the ECU when the vehicle is to travel in the remote driving mode. The ECU then outputs the evaluation information regarding the plural remote operators transmitted from the remote operator selection server through the output device inside the vehicle, acquires a remote operator selection result input by the occupant of the vehicle, and transmits the remote operator selection result to the remote operator selection server. The remote operator selection server then selects the remote operator to remotely operate the vehicle in response to the selection result transmitted from the ECU, transmits the remote operation terminal ID representing the selected remote operator to the ECU, and transmits the vehicle ID representing the vehicle to the remote operation terminal operated by the selected remote operator. When the vehicle travels in the remote driving mode, the ECU controls travel of the vehicle in response to operation information transmitted from the remote operation terminal corresponding to the remote operation terminal ID transmitted from the remote operator selection server. Thus, reference can made to the evaluation information regarding the remote operators, and remote operation tailored to the preferences of the vehicle occupant can be implemented when the vehicle travels in the remote driving mode.

Note that although explanation has been given in which the processing performed by the respective devices of the exemplary embodiment described above is implemented by software processing by executing a program, processing may be performed using hardware. Alternatively, processing may be performed using a combination of both software and hardware. Alternatively, a program stored in the ROM may be distributed stored on storage media of various types.

The technology disclosed herein is not limited to that described above, and obviously various other modifications may be implemented within a range not departing from the spirit of the technology disclosed herein.

In consideration of the above circumstances, an object of the technology disclosed herein is to provide a vehicle control system and a vehicle control method that enable remote operation tailored to preferences of an occupant of a vehicle to be implemented when the vehicle travels in a remote driving mode.

A vehicle control system according to a first aspect includes a remote operator selection server, a vehicle control device configured to control a vehicle capable of traveling in an independent autonomous driving mode, a remote driving mode, and a manual driving mode, and a remote operation terminal configured to operate a vehicle remotely. The vehicle control device is configured to refer to a manual operation information storage section holding manual operation information representing details of actual operation by an occupant of the vehicle when in the manual driving mode, and to transmit the manual operation information for the occupant held in the manual operation information storage section to the remote operator selection server. The remote operator selection server is configured to acquire the manual operation information transmitted from the vehicle control device, refer to a remote operation information storage section that holds remote operation information for each of plural remote operators, the remote operation information representing details of actual remote vehicle operation by the remote operator, compute a difference between the manual operation information and the remote operation information for each of the plural remote operators, select the remote operator for whom the difference satisfies a predetermined criterion as a remote operator to remotely operate the vehicle, transmit remote operator information representing the selected remote operator to the vehicle control device, and transmit vehicle information representing the vehicle to the remote operation terminal operated by the selected remote operator. The vehicle control device is further configured to control travel of the vehicle in response to operation information transmitted from the remote operation terminal corresponding to the remote operator information transmitted from the remote operator selection server in order to cause the vehicle to travel in the remote driving mode.

The vehicle control system according to the first aspect acquires the manual operation information of the occupant transmitted from the vehicle control device, computes the difference between the manual operation information and the remote operation information for each of the plural remote operators, and selects a remote operator for whom the difference satisfies the predetermined criterion as the remote operator to remotely operate the vehicle. The vehicle control system then transmits the remote operator information representing the selected remote operator to the vehicle control device, and transmits the vehicle information representing the vehicle to the remote operation terminal operated by the selected remote operator. In this manner, the vehicle control device of the vehicle and the remote operation terminal are associated with each other. The vehicle control system controls travel of the vehicle in response to the operation information transmitted from the remote operation terminal corresponding to the remote operator information transmitted from the remote operator selection server in order to cause the vehicle to travel in the remote driving mode. Travel of the vehicle in the remote driving mode is thus performed by a remote operator having remote operation information similar to the manual operation information. This enables remote operation tailored to the preferences of the vehicle occupant to be implemented.

Note that the remote operator information is information representing details of actual remote vehicle operation by the remote operator. The manual operation information is information representing details of actual operation by the occupant of the vehicle when in the manual driving mode.

A vehicle control system according to a second aspect includes a remote operator selection server, a vehicle control device configured to control a vehicle capable of traveling in an independent autonomous driving mode, a remote driving mode, and a manual driving mode, and a remote operation terminal configured to operate a vehicle remotely. The vehicle control device is configured to acquire evaluation information representing an evaluation regarding a remote operator input by an occupant of the vehicle either during travel in the remote driving mode or after travel in the remote driving mode has ended, and transmit the acquired evaluation information to the remote operator selection server. The remote operator selection server is configured to append the evaluation information transmitted from the vehicle control device to remote operator information representing the remote operator, and store the evaluation information in a remote operation information storage section that holds the evaluation information for each of plural remote operators. The remote operator selection server is further configured to transmit the evaluation information regarding the plural remote operators held in the remote operation information storage section to the vehicle control device at switching of the vehicle to the remote driving mode. The vehicle control device is further configured to output the evaluation information regarding the plural remote operators transmitted from the remote operator selection server through an output device inside the vehicle, acquire a remote operator selection result input by the occupant of the vehicle, and transmit the remote operator selection result to the remote operator selection server. The remote operator selection server is further configured to select a remote operator to remotely operate the vehicle in response to the selection result transmitted from the vehicle control device, transmit remote operator information representing the selected remote operator to the vehicle control device, and transmit vehicle information representing the vehicle to the remote operation terminal operated by the selected remote operator. The vehicle control device is further configured to control travel of the vehicle in response to operation information transmitted from the remote operation terminal corresponding to the remote operator information transmitted from the remote operator selection server in order to cause the vehicle to travel in the remote driving mode.

The vehicle control system according to the second aspect transmits the evaluation information regarding the plural remote operators held in the remote operation information storage section to the vehicle control device at switching of the vehicle to the remote driving mode. The vehicle control device outputs the evaluation information regarding the plural remote operators transmitted from the remote operator selection server through the output device inside the vehicle, and acquires the remote operator selection result input by the vehicle occupant. The vehicle control device of the vehicle control system then transmits the remote operator selection result to the remote operator selection server, and the remote operator selection server selects the remote operator to remotely operate the vehicle in response to the selection result transmitted from the vehicle control device. The remote operator selection server further transmits the remote operator information representing the selected remote operator to the vehicle control device, and transmits the vehicle information representing the vehicle to the remote operation terminal operated by the selected remote operator. The vehicle control device of the vehicle control system then controls travel of the vehicle in response to the operation information transmitted from the remote operation terminal corresponding to the remote operator information transmitted from the remote operator selection server in order to cause the vehicle to travel in the remote driving mode. This enables the occupant of the vehicle to select a preferred remote operator by referring to the evaluation information appended to the remote operators. Travel of the vehicle in the remote driving mode is then performed by the remote operator selected by the occupant. This enables remote operation tailored to preferences of the occupant of the vehicle to be implemented.

A vehicle control system according to a third aspect is a vehicle control system in which selection of the remote operator is performed during travel in either the independent autonomous driving mode or the manual driving mode. Accordingly, the remote operator is selected at an appropriate timing prior to starting travel in the remote driving mode.

A vehicle control system according to a fourth aspect is a vehicle control system in which a type of operation information to be employed in selection of the remote operator is selected by the occupant of the vehicle. Since the occupant selects which type of operation information to focus on, this enables remote operation tailored to the preferences of the occupant of the vehicle to be implemented.

A vehicle control method according to a fifth aspect is a vehicle control method for a vehicle control system including a remote operator selection server, a vehicle control device configured to control a vehicle capable of traveling in an independent autonomous driving mode, a remote driving mode, and a manual driving mode, and a remote operation terminal configured to operate a vehicle remotely. The vehicle control method includes the vehicle control device referring to a manual operation information storage section holding manual operation information representing details of actual operation by an occupant of the vehicle when in the manual driving mode, and transmitting the manual operation information for the occupant held in the manual operation information storage section to the remote operator selection server, the remote operator selection server acquiring the manual operation information transmitted from the vehicle control device, referring to a remote operation information storage section that holds remote operation information for each of plural remote operators, the remote operation information representing details of actual remote vehicle operation by the remote operator, computing a difference between the manual operation information and the remote operation information for each of the plural remote operators, selecting the remote operator for whom the difference satisfies a predetermined criterion as a remote operator to remotely operate the vehicle, transmitting remote operator information representing the selected remote operator to the vehicle control device, and transmitting vehicle information representing the vehicle to the remote operation terminal operated by the selected remote operator, and the vehicle control device further controlling travel of the vehicle in response to operation information transmitted from the remote operation terminal corresponding to the remote operator information transmitted from the remote operator selection server in order to cause the vehicle to travel in the remote driving mode.

A vehicle control method according to a sixth aspect is a vehicle control method for a vehicle control system including a remote operator selection server, a vehicle control device configured to control a vehicle capable of traveling in an independent autonomous driving mode, a remote driving mode, and a manual driving mode, and a remote operation terminal configured to operate a vehicle remotely. The vehicle control method includes the vehicle control device acquiring evaluation information representing an evaluation regarding a remote operator input by an occupant of the vehicle either during travel in the remote driving mode or after travel in the remote driving mode has ended, and transmitting the acquired evaluation information to the remote operator selection server, the remote operator selection server appending the evaluation information transmitted from the vehicle control device to remote operator information representing the remote operator, and storing the evaluation information in a remote operation information storage section that holds the evaluation information for each of plural remote operators, the remote operator selection server further transmitting the evaluation information regarding the plural remote operators held in the remote operation information storage section to the vehicle control device at switching of the vehicle to the remote driving mode, the vehicle control device further outputting the evaluation information regarding the plural remote operators transmitted from the remote operator selection server through an output device inside the vehicle, acquiring a remote operator selection result input by the occupant of the vehicle, and transmitting the remote operator selection result to the remote operator selection server, the remote operator selection server further selecting a remote operator to remotely operate the vehicle in response to the selection result transmitted from the vehicle control device, transmitting remote operator information representing the selected remote operator to the vehicle control device, and transmitting vehicle information representing the vehicle to the remote operation terminal operated by the selected remote operator, and the vehicle control device further controlling travel of the vehicle in response to operation information transmitted from the remote operation terminal corresponding to the remote operator information transmitted from the remote operator selection server in order to cause the vehicle to travel in the remote driving mode.

As described above, the technology described herein exhibits the advantageous effect of enabling remote operation tailored to preferences of an occupant of a vehicle to be implemented when the vehicle travels in the remote driving mode.

The disclosures of Japanese Patent Application No. 2019-136248 filed on Jul. 24, 2019 are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. A vehicle control system, comprising:
   a remote operator selection server comprising:
      a first memory, and
      a first processor coupled to the first memory;
   a vehicle control device comprising:
      a second memory, and
      a second processor coupled to the second memory, the second processor being configured to control a vehicle configured to travel in a remote driving mode and a manual driving mode; and
   a remote operation terminal comprising:
      a third memory, and
      a third processor coupled to the third memory, the third processor being configured to operate a vehicle remotely, wherein:
   the second processor is configured to transmit manual operation information representing details of actual operation by an occupant of the vehicle when in the manual driving mode, to the remote operator selection server;
   the first processor is configured to acquire the manual operation information transmitted from the vehicle control device, and to select a remote operator to remotely operate the vehicle, based on remote operation information for each of a plurality of remote operators, the remote operation information representing details of actual remote vehicle operation by each of the plurality of remote operators, and the manual operation information; and
   the second processor is further configured to control travel of the vehicle in response to operation information transmitted from the remote operation terminal corresponding to remote operator information transmitted from the remote operator selection server at a time of causing the vehicle to travel in the remote driving mode.

2. The vehicle control system of claim 1, wherein the first processor is further configured to compute a difference between the remote operation information for each of the plurality of remote operators and the manual operation information, and to select a remote operator for whom the difference satisfies a predetermined criterion as a remote operator.

3. The vehicle control system of claim 1, wherein selection of the remote operator is performed during travel in the manual driving mode.

4. The vehicle control system of claim 1, wherein a type of operation information to be employed in selection of the remote operator is selected by the occupant of the vehicle.

5. A vehicle control method for a vehicle control system comprising:
- a remote operator selection server comprising:
  - a first memory, and
  - a first processor coupled to the first memory;
- a vehicle control device comprising;
  - a second memory, and
  - a second processor coupled to the second memory, the second processor being configured to control a vehicle configured to travel in a remote driving mode and a manual driving mode; and
- a remote operation terminal comprising:
  - a third memory, and
  - a third processor coupled to the third memory, the third processor being configured to operate a vehicle remotely, the vehicle control method comprising:
- the second processor transmitting manual operation information representing details of actual operation by an occupant of the vehicle when in the manual driving mode, to the remote operator selection server;
- the first processor acquiring the manual operation information transmitted from the vehicle control device, and selecting a remote operator to remotely operate the vehicle, based on remote operation information for each of a plurality of remote operators, the remote operation information representing details of actual remote vehicle operation by each of the plurality of remote operators, and the manual operation information; and
- the second processor further controlling travel of the vehicle in response to operation information transmitted by the third processor from the remote operation terminal corresponding to remote operator information transmitted from the remote operator selection server at a time of causing the vehicle to travel in the remote driving mode.

* * * * *